United States Patent
Winkler et al.

(10) Patent No.: US 9,151,385 B2
(45) Date of Patent: Oct. 6, 2015

(54) MULTI-PART PISTON CONSTRUCTION FOR A BRAKE CALIPER OF A DISK BRAKE

(75) Inventors: Thomas Winkler, Mainz (DE); Uwe Zeibig, Achern (DE); Dirk Koch, Lollar-Odenhausen (DE); Anja Klimt, Frankfurt/M (DE); Herwig Bauer, Bad Vilbel (DE)

(73) Assignee: Continental Teves AG & Co. oHG (DE)

( * ) Notice: Subject to any disclaimer, the term of this patent is extended or adjusted under 35 U.S.C. 154(b) by 981 days.

(21) Appl. No.: 12/967,390

(22) Filed: Dec. 14, 2010

(65) Prior Publication Data

US 2011/0132188 A1  Jun. 9, 2011

Related U.S. Application Data

(63) Continuation of application No. PCT/EP2009/057175, filed on Jun. 10, 2009, and a continuation-in-part of application No. 12/739,808, filed as application No. PCT/EP2008/064348 on Oct. 23, 2008.

(30) Foreign Application Priority Data

| Oct. 27, 2007 | (DE) | 10 2007 051 456 |
| Jun. 17, 2008 | (DE) | 10 2008 028 412 |
| Mar. 20, 2009 | (DE) | 10 2009 001 712 |
| Apr. 9, 2009 | (DE) | 10 2009 017 167 |

(51) Int. Cl.
*F16D 55/02* (2006.01)
*F16D 55/08* (2006.01)
(Continued)

(52) U.S. Cl.
CPC .. *F16J 1/12* (2013.01); *F16J 1/006* (2013.01); *F16D 65/567* (2013.01); *F16D 2121/14* (2013.01); *F16D 2125/06* (2013.01); *F16D 2125/40* (2013.01)

(58) Field of Classification Search
CPC .......... F16D 1/05; F16D 65/18; F16D 65/567
USPC .......... 188/71.9, 72.8, 71.1, 1.11 E, 156, 162, 188/106 A, 196 C, 196 D, 72.6, 106 P
See application file for complete search history.

(56) References Cited

U.S. PATENT DOCUMENTS

| 3,688,875 A | * | 9/1972 | De Hoff et al. | 188/71.9 |
| 4,256,206 A | * | 3/1981 | Maehara | 188/71.9 |

(Continued)

FOREIGN PATENT DOCUMENTS

| DE | 39 43 106 A1 | 7/1991 |
| DE | 41 21 026 A1 | 1/1993 |

(Continued)

OTHER PUBLICATIONS

U.S. Appl. No. 12/739,808, filed Apr. 26, 2010, Koch.

*Primary Examiner* — Anna Momper
*Assistant Examiner* — San Aung
(74) *Attorney, Agent, or Firm* — RatnerPrestia

(57) ABSTRACT

A multi-part piston for a brake saddle of a hydraulically and/or mechanically and/or electromechanically actuated disk brake is described herein. The piston is a pot open on one side and including a base and a wall attached thereto in one piece. The base can be impinged by brake pressure coming from the inside of the pot so that an outward-facing abutting surface of the base can be pressed against a brake lining. The inside of the pot receives at least one pressure piece associated with a parking brake mechanism. For simplified manufacture in the form of a modular piston system for use in various applications, it is proposed that the pressure piece and the base comprise conical surfaces facing one another for transferring braking pressure.

7 Claims, 5 Drawing Sheets

(51) Int. Cl.
  *F16J 1/12* (2006.01)
  *F16J 1/00* (2006.01)
  *F16D 65/56* (2006.01)
  *F16D 121/14* (2012.01)
  *F16D 125/06* (2012.01)
  *F16D 125/40* (2012.01)

(56) References Cited

U.S. PATENT DOCUMENTS

| | | | |
|---|---|---|---|
| 4,678,065 A * | 7/1987 | Erben et al. | 188/196 D |
| 4,793,447 A | 12/1988 | Taig et al. | |
| 4,917,220 A * | 4/1990 | Ikegami | 188/196 D |
| 5,009,292 A * | 4/1991 | Hoffman | 188/71.7 |
| 5,086,884 A | 2/1992 | Gordon | |
| 5,219,047 A | 6/1993 | Fouilleux et al. | |
| 5,350,042 A * | 9/1994 | Thiel | 188/71.9 |
| 5,443,141 A * | 8/1995 | Thiel et al. | 188/71.9 |
| 6,053,289 A * | 4/2000 | Bauer et al. | 188/71.9 |
| 6,382,367 B1 | 5/2002 | Varzescu | |
| 6,397,981 B1 * | 6/2002 | Tamasho et al. | 188/71.9 |
| 6,637,317 B1 | 10/2003 | Zeibig et al. | |
| 6,659,236 B1 * | 12/2003 | Clark et al. | 188/79.52 |
| 6,938,735 B1 * | 9/2005 | Hilzinger | 188/72.1 |
| 7,007,775 B2 * | 3/2006 | Kapaan et al. | 188/1.11 E |
| 2003/0050147 A1 * | 3/2003 | Backes et al. | 475/343 |
| 2003/0102192 A1 * | 6/2003 | Kapaan | 188/72.7 |
| 2007/0029144 A1 * | 2/2007 | Sekiguchi | 188/72.8 |
| 2007/0062769 A1 * | 3/2007 | Noh | 188/265 |
| 2008/0283345 A1 | 11/2008 | Balz et al. | |
| 2008/0314239 A1 | 12/2008 | Leidecker et al. | |
| 2009/0133975 A1 | 5/2009 | Gilles | |

FOREIGN PATENT DOCUMENTS

| | | |
|---|---|---|
| DE | 199 39 873 A1 | 8/1999 |
| DE | 10 2005 061 354 A1 | 6/2007 |
| DE | 10 2007 051 456 A1 | 4/2009 |
| EP | 0 063 871 | 11/1982 |
| EP | 0 396 231 | 11/1990 |
| EP | 1 043 513 A2 | 10/2000 |
| EP | 2 043 412 A1 | 4/2009 |
| GB | 1 240 222 | 7/1971 |
| JP | S57104026 U | 6/1982 |
| JP | S6043739 U | 3/1985 |
| JP | H2102935 A | 4/1990 |
| JP | 10-122280 | 5/1998 |
| JP | 2007120728 A | 5/2007 |
| WO | WO 93/00524 | 1/1993 |
| WO | WO 2007/036357 A1 | 4/2007 |
| WO | WO 2007/051809 A1 | 5/2007 |
| WO | WO 2009/053425 A1 | 4/2009 |

* cited by examiner

MULTI-PART PISTON CONSTRUCTION FOR A BRAKE CALIPER OF A DISK BRAKE

CROSS REFERENCE TO RELATED APPLICATIONS

This application is a continuation of PCT International Patent Application No. PCT/EP2009/057175, filed Jun. 10, 2009, which claims priority to German Patent Application No. 10 2008 028 412.2, filed Jun. 17, 2008, German Patent Application No. 10 2009 001 712.7, filed Mar. 20, 2009, and German Patent Application No. 10 2009 017 167.3, filed Apr. 9, 2009, the contents of such applications being incorporated by reference herein. This application is also a continuation-in-part of U.S. patent application Ser. No. 12/739,808, filed Apr. 26, 2010, which is a U.S. National Phase Patent Application of PCT/EP2008/064348, filed Oct. 23, 2008 that claims priority to German Patent Application No. 10 2007 051 456.7, filed Oct. 27, 2007, the contents of such applications being incorporated by reference herein.

FIELD OF THE INVENTION

The invention relates to a multi-part piston construction for a hydraulically and/or mechanically and/or electromechanically actuatable brake caliper of a disk brake, which piston is substantially in the form of a pot-like hollow cylinder which is open at one end and includes a base and a wall formed integrally thereon, wherein the base can be subjected to brake pressure coming from the interior of the pot, so that an outwardly oriented abutment face of the base can be pressed against a brake pad, and wherein the interior of the pot receives a pressure piece.

BACKGROUND OF THE INVENTION

A brake caliper which is actuatable hydraulically and mechanically in combination and includes a piston is known from EP 0 396 231 A1, which is incorporated by reference. In this case the wall has a conical surface which cooperates with a separate cone and with a separately provided threaded nut which is driven by a threaded spindle. Through its basic principle, the known arrangement makes possible a compensation of brake pad wear for use in a disk brake having a parking brake device. Indications of an especially cost-effective construction of a disk brake are not to be found in this document.

Furthermore, known arrangements lack an adaptation to electromechanically actuatable brake actuator systems wherein a parking brake device acts on the brake piston by means of a transmission, the transmission converting a rotary motion of an actuator system into a translational motion, causing an actuation of the brake piston in order to execute parking brake operations and holding the brake piston in the actuated position, and wherein the transmission comprises a threaded spindle and a threaded nut.

Independently of the above it is necessary, of course, to specify a solution for the structure of a motor vehicle disk brake which is entirely without a parking brake function.

Accordingly, differently configured motor vehicle brakes and their actuator systems require in principle differently configured components, which requirement incurs increased complexity and cost both in the production of the vehicle brakes and in subsequent logistics, such as the supply of replacement parts. The same applies in principle to motor vehicle brakes with or without compensation for brake pad wear.

It is an object of the invention to make possible a supply of identical parts as comprehensive as possible in the manufacture and subsequent logistics of all vehicle brakes, and to reduce the manufacturing complexity and cost. This goes hand-in-hand with the question of making available an advantageous modular system.

SUMMARY OF THE INVENTION

The foregoing object of the invention is achieved by a multi-part piston for a brake caliper of a hydraulically and/or mechanically and/or electromechanically actuatable disk brake, which piston is substantially in the form of a pot-like hollow cylinder which is open at one end and includes a base and a wall formed integrally thereon, wherein the base can be subjected to brake pressure coming from the interior of the pot, so that an outwardly oriented abutment face of the base can be pressed against a brake pad, and wherein the interior of the pot receives at least one pressure piece which is incorporated, in particular, in a power flow of a parking brake mechanism, wherein the pressure piece and the base have conical surfaces oriented towards one another for transmitting power.

According to aspects of the invention, it is provided that a pressure piece—integrated in the power flow—and a base have conical surfaces oriented towards one another for transmitting brake pressure. The fact that the pressure is applied directly to the base by means of the pressure piece via an inwardly reverse-drawn bead of the base, in conjunction with the adapted pressure piece which acts in a sense as an adapter, makes possible cost-effective manufacture of the piston from sheet metal material, in particular by forming techniques, within a modular piston system. In applications of the piston to disk brakes without parking brake devices or pad wear compensation, the pressure piece can simply be omitted. The need to produce specially adapted pistons is eliminated.

In order to save overall axial length, the pressure piece may be provided with a central through-bore.

Receptacles between piston, pressure piece and threaded nut are configured in such a manner that relative rotation is prevented.

All the conical surfaces preferably have matching cone angles, so that in principle one tool is sufficient.

A recess in the pressure piece may receive a shoulder. For improved venting of the recess at least one passage is advantageous.

In general, the pressure piece may be fixed in the piston (through press-forming) both axially and non-rotatably, or it is positioned in the piston in a non-rotatable but axially displaceable manner.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

In the figures, parts of a disk brake for a motor vehicle are shown, in some cases schematically and enlarged.

Figure 1:
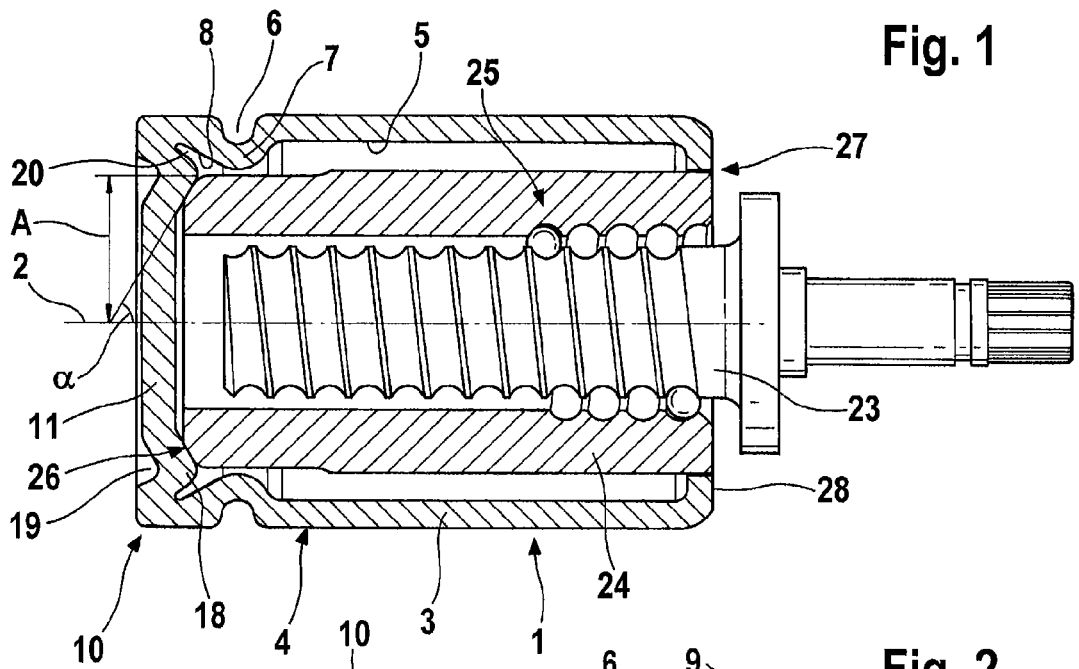
FIG. 1 shows a first embodiment of a piston together with a drive nut and a drive spindle.

FIG. 1 shows a piston 1 with a drive spindle 23 and a drive nut 24 in longitudinal section. The piston 1, which is embodied in such a way as to be rotationally symmetrical about a longitudinal axis 2, is configured as a pot which is open at one end, having a wall 3 and a piston head 11, it being possible for the piston head 11 to be placed against a brake pad (not shown) at the closed end of the piston 1 by means of an axial contact surface 12. The contact surface 12 is larger than a cross-sectional area 9 at the weakest point of the wall 3. Moreover, a circumferential groove 6 is rolled into an outer side 4 of the wall 3 in the vicinity of the contact surface 12, the said groove serving to receive a piston protection cap (not shown) when the piston is installed in the brake caliper. The contour of the rolled-in groove 6 is continued throughout the entire cross section of the wall 3 and thus gives rise to a shoulder 7 on an inner side 5 of the wall 3 of the piston 1.

Figure 3:
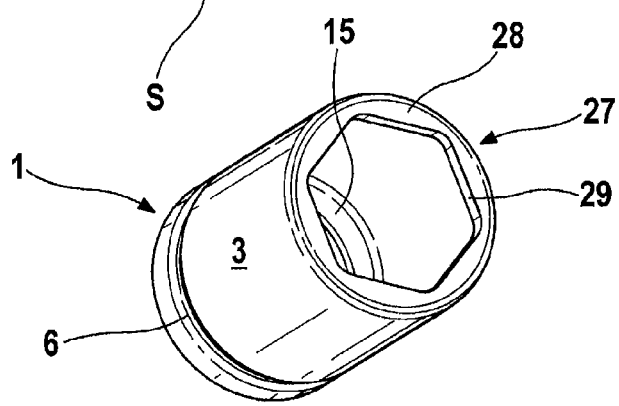
FIG. 3 shows a perspective view of the open end of the piston in FIG. 1.

Arranged on an inner surface 13 of the piston head 11 is a projection 18 with a conical surface 15, against which the drive nut 24 can be placed. In this arrangement, the conical surface 15 preferably encloses an angle α of about 60° with the longitudinal axis 2 in the axial direction, thereby ensuring centred and defined contact with the drive nut 24. The piston 1 and the drive nut 24 are connected to one another in a rotationally fixed manner relative to the longitudinal axis 2 and are held in such a way that they can be moved relative to one another in the axial direction. The piston 1 or the drive nut 24 are secured against twisting in the brake caliper housing in a manner which is not shown. As shown in FIG. 3, the anti-twist safeguard 27 between the piston 1 and the drive nut 24 is achieved by providing the open end of the piston 1 with an integral end surface 28 that has a contour 29 which forms the positive-locking anti-twist safeguard 27 together with a complementary contour on the drive nut 24.

In the case of mechanical actuation of the disc brake, the drive spindle 23 arranged in the drive nut 24 is turned, for example by means of an electric motor with a gear mechanism arranged on the output side. Since the drive spindle 23 and the drive nut 24 are provided with a ball screw thread 25, the rotary motion of the drive spindle 23 is converted by the ball screw thread 25 into an axial movement of the drive nut 24. The said nut comes to rest against the piston 1 by means of a conical surface 26 complementary to the conical surface 15 and moves the said piston.

Figure 2:
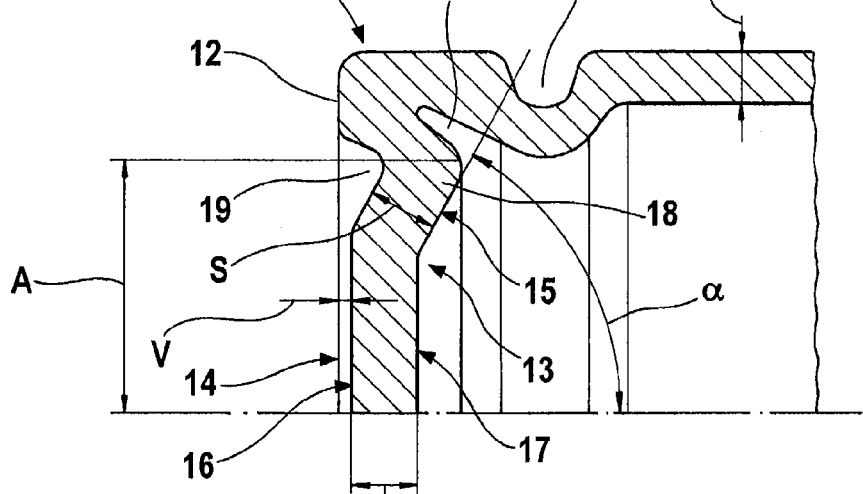
FIG. 2 shows an enlarged detail of the piston in FIG. 1.

The geometrical configuration of the transitional region 10 between the wall 3 and the piston head 11 is illustrated on an enlarged scale in FIG. 2. In its outer surface 14, the piston head 11 has a recess 19 and, on its inner surface 13, has the projection 18, which is formed in a rotationally symmetrical manner, in a ring around the longitudinal axis 2. The recess 19 is formed in the piston head 11 from the outside by forming, resulting in the emergence of the projection 18 in parallel on the inner surface 13 of the piston head 11. The recess 19 is substantially at the same distance A from the longitudinal axis 2 of the piston 1 as the projection 18.

Starting from the longitudinal axis 2 of the piston 1, the piston head 11 is described by a flat outer and a flat inner head surface 16, 17, both of which extend substantially perpendicularly to the longitudinal axis 2. The outer head surface 16 is designed with a slight axial offset V in relation to the axial maximum dimension of the piston 1, making it impossible for this region of the piston 1 to be placed against a brake pad (not shown). The flat outer head surface 16 merges into the annular recess 19, which has a rounded triangular contour in longitudinal section. The inner flat head surface 17 opens out into the annular projection 18, which rises substantially parallel to the recess 19 from the piston head 11 and bears the conical surface 15. The projection 18 is formed closer to the longitudinal axis 2 than the recess 19 by an amount which allows a substantially constant wall thickness S in the piston head 11. Like the recess 19, the projection 18 has a rounded triangular contour.

Likewise starting from the longitudinal axis 2, both the recess 19 and the projection 18 are formed backwards in the axial direction, the recess 19 merging directly into the contact surface 12. Together with the shoulder 7 on the inner side 5 of the wall 3, the projection 18 on the inner surface 13 of the piston head 11 forms a gap 20 brought about by folding, making it possible to form the conical surface 15 for contact with a drive nut 24 without a thickened portion in the transitional region 10. Depending on the size of the piston diameter, the gap 20 will tend to be a more or less zero-volume fold at small diameters or a volume in the form of a gap at large diameters. The inner shoulder surface 8 facing the piston head 11 can furthermore be designed as a bevel.

Figure 4:
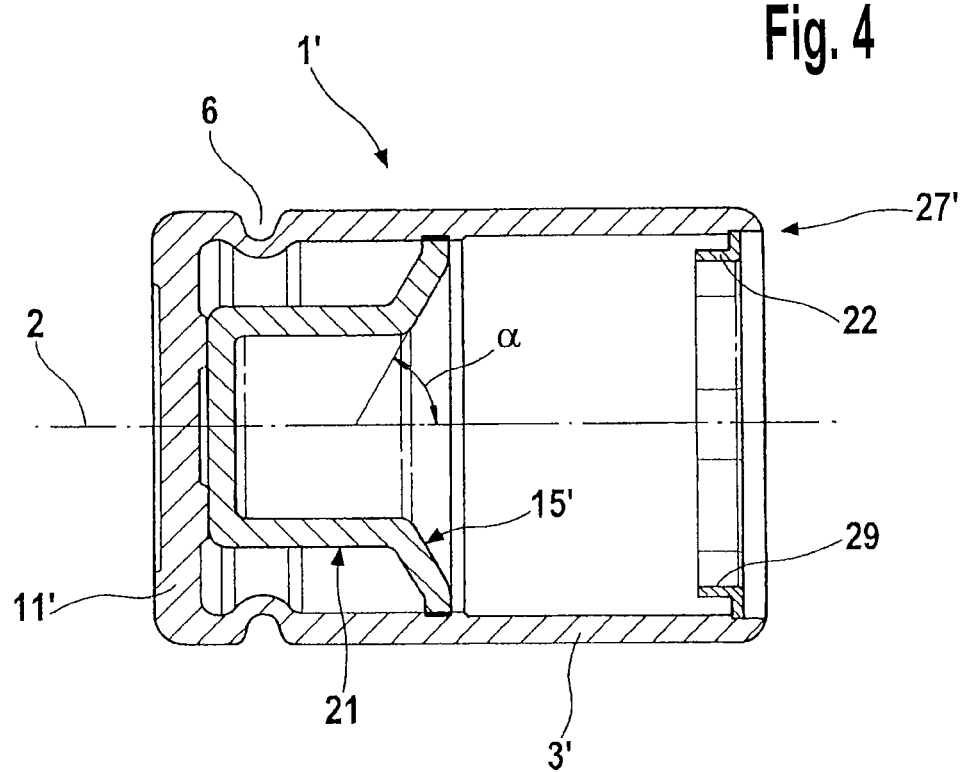
FIG. 4 shows a second embodiment of a piston.
Figure 5:
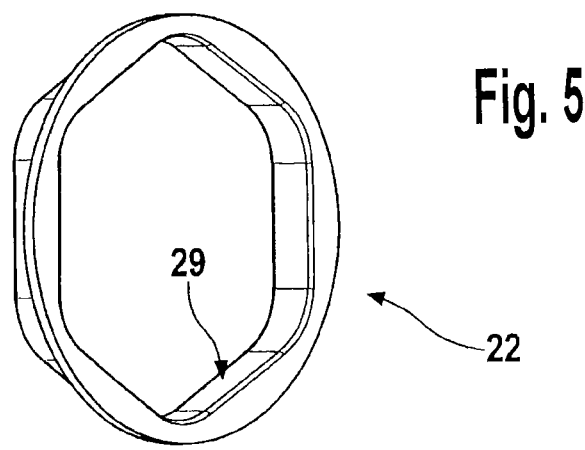
FIG. 5 shows a perspective view of the insert shown in FIG. 4.
Figure 6:
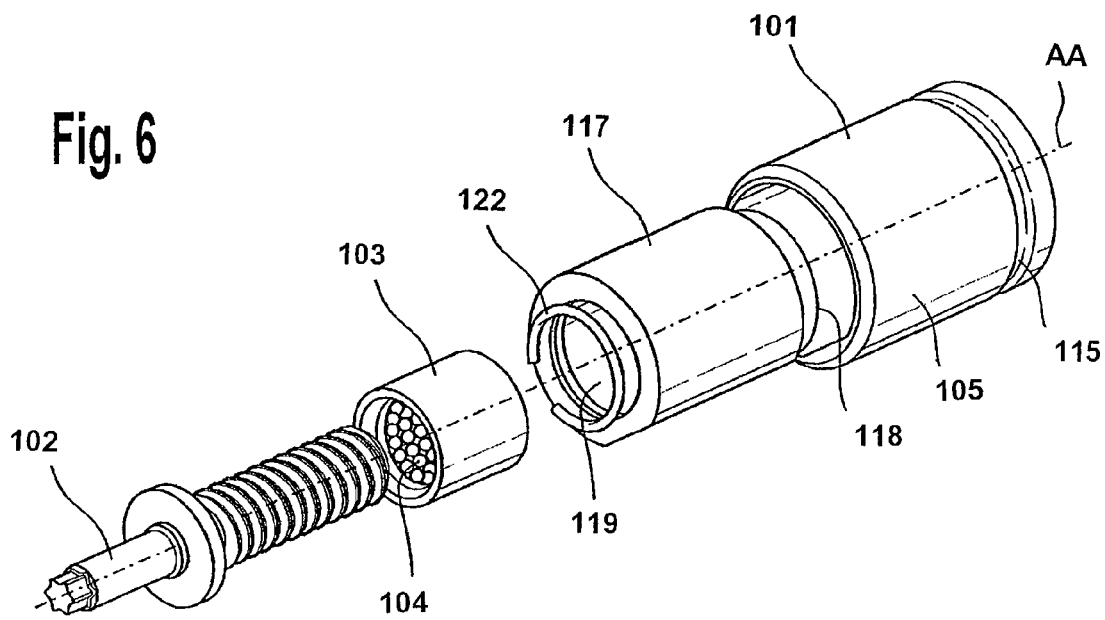
FIG. 6 is an exploded drawing of another alternative embodiment of a piston.
Figure 7:
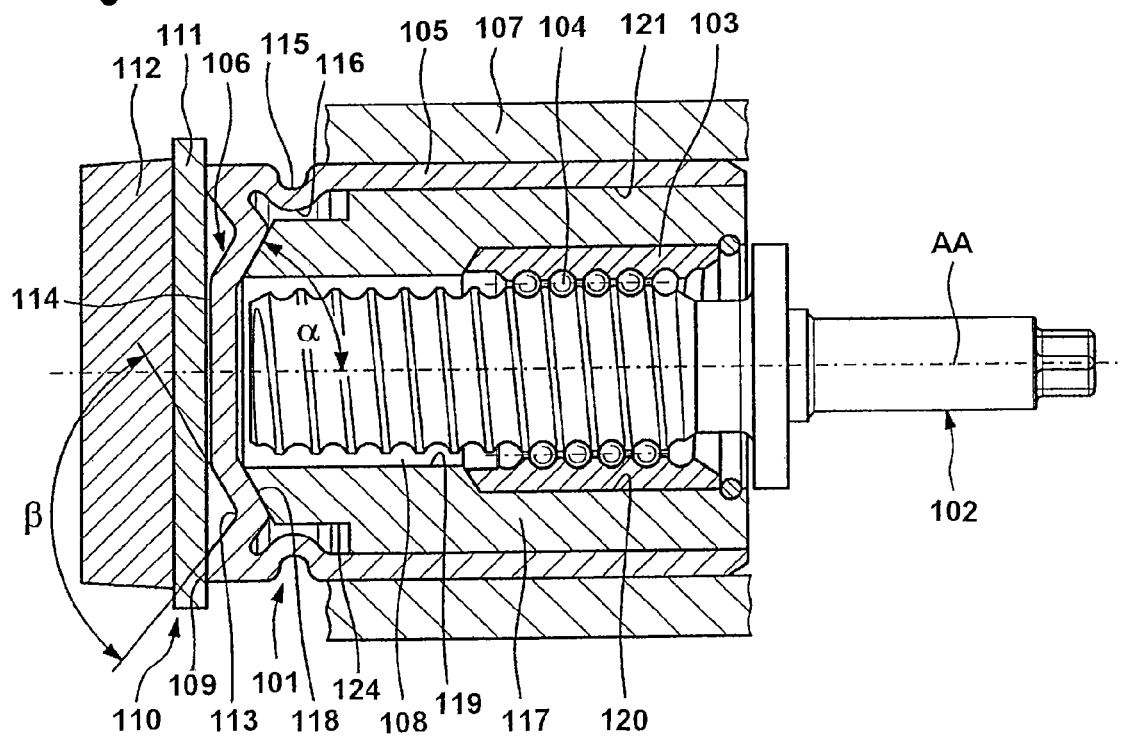
FIG. 7 shows a section through the piston arrangement of FIG. 6.
Figure 8:
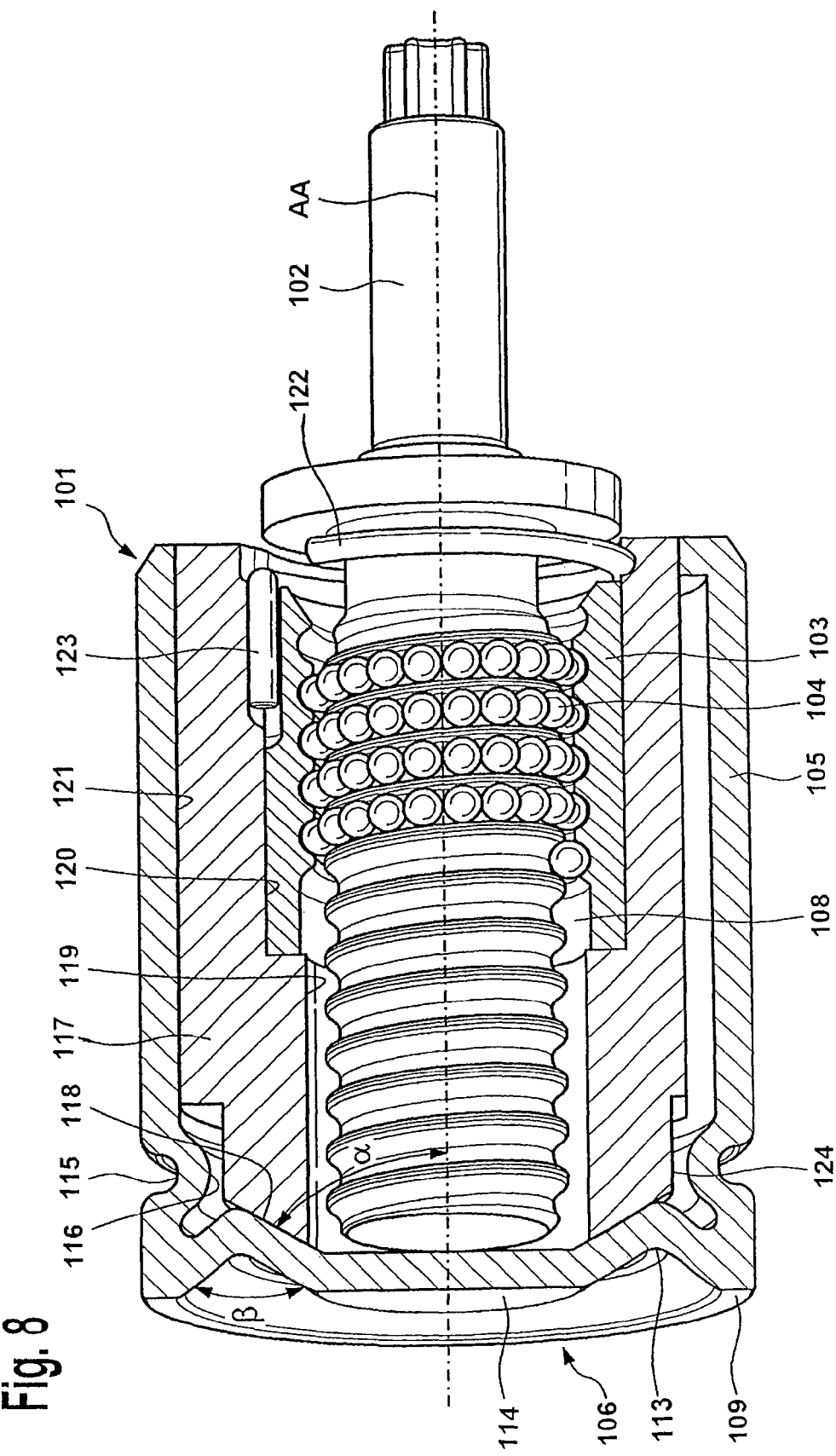
FIG. 8 shows further details of the piston arrangement according to FIG. 7 on an enlarged scale.
Figure 9:
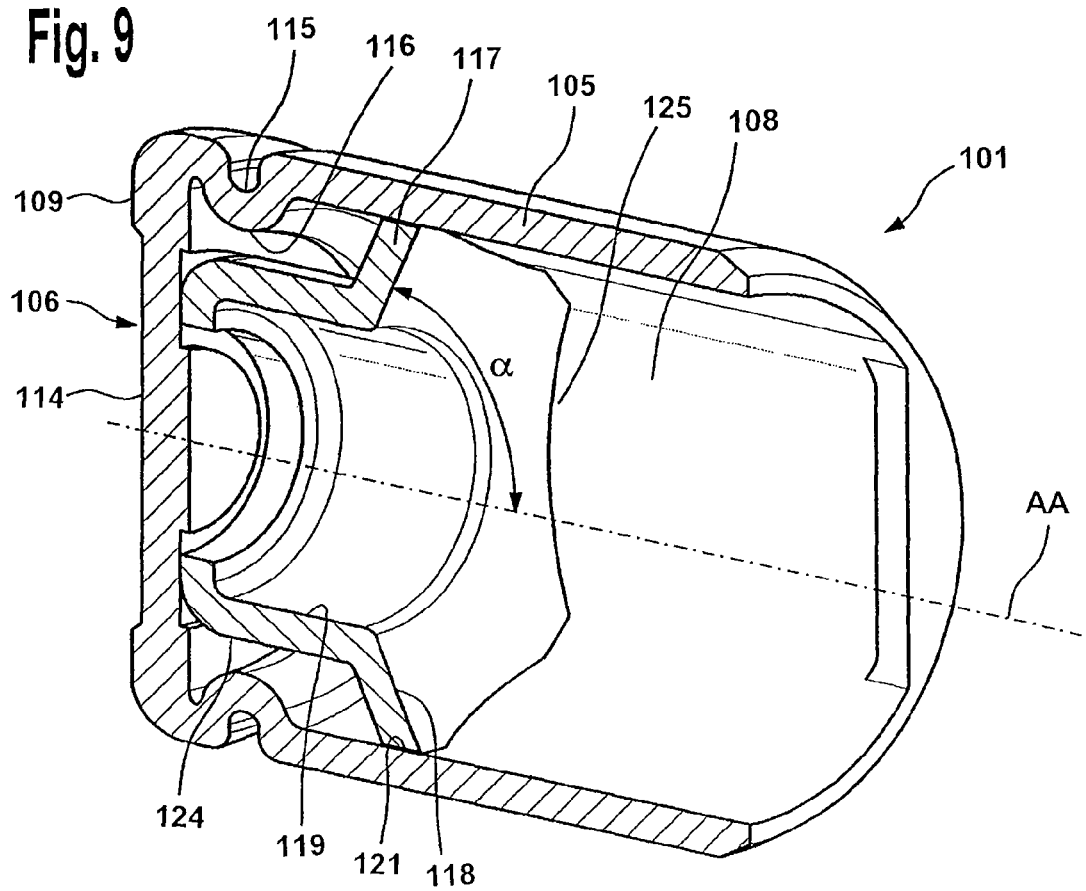
FIG. 9 shows a variant with recess and passage in perspective.
Figure 10:
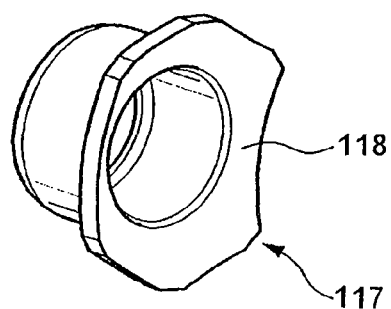
FIG. 10 is a perspective view of a pressure piece with a portion corresponding to FIG. 9.

FIG. 4 shows an embodiment corresponding to an equivalent means of achieving the object of the invention. Here, the piston head 11' of the piston 1' does not have a projection but forms the conical surface 15' for the application of a drive spindle on a cup 21, which forms part of a two-piece arrangement, as a separate component, in the piston 1' and is produced from a flat metal sheet by forming. This cup 21 is supported axially against the piston head 11' and is connected in a sealing manner to the wall 3' of the piston 1'. This has the effect that the dead volume of the piston 1' is reduced, the leaktight connection between the cup 21 and the wall 3' being achieved by means of laser or friction welding. In this arrangement, the conical surface 15' of the cup 21 preferably encloses an angle α of about 60° with the longitudinal axis 2 in the axial direction.

This illustrative embodiment of the equivalent solution will also be used to show a further way of embodying an anti-twist safeguard 27' between the drive nut and the piston 1', although there is no intention to restrict this safeguard to the illustrative embodiment under consideration. Here, an insert 22 is provided, this insert being connected in a rotationally fixed manner to the wall 3', by crimping for example. This insert 33 bears the contour 29, which forms the positive-locking anti-twist safeguard 27' with a complementary contour on the drive nut. The contour 29 can be in the form of a rounded hexagon.

Another illustrative embodiment of the invention is shown in FIGS. 6-10. The figures show a piston 101 and, at least partially integrated therein, a threaded spindle 102 with a threaded nut 103 of a parking brake device, which threaded spindle 102 and threaded nut 103 act as a transmission for converting a rotary drive motion into a translational piston displacement in a so-called electromechanically actuatable, combined motor vehicle brake (EPB). With regard to the operation and marginal conditions of an electromechanically actuatable, combined motor vehicle brake, reference is made to the disclosure of WO2007/051809A1, which is incorporated by reference.

The piston is in principle in the form of a hollow cylinder which is rotationally symmetrical about a longitudinal axis 104 and is open at one end, and which has a wall 105 with a base 106 arranged integrally thereon, said piston being guided in an axially displaceable manner in a housing 107. In most cases a so-called protective cap is sufficient to prevent relative rotation between housing 107 and piston 101. A sealing element (not shown) which bears elastically against the wall 105 from radially outside may also serve to prevent rotation between housing 107 and piston 101. The base 106 can in principle be impinged upon by pressure medium coming from the interior 108 of the pot. In consequence, an outwardly oriented, substantially circular abutment face 109 of the base 106 is pressed against a brake pad 110. The brake pad 110 comprises a backplate 111 and a friction lining 112 which is applied to a brake disk (not drawn). Although it is not apparent in detail from the schematic figure, the abutment face 109 against the backplate 111 may preferably have a mean diameter which is configured to be smaller in comparison to a mean diameter of the wall 105. From considerations of stress, the abutment face 109 may be dimensioned such that it is larger than a smallest cross section of the wall 105 at its weakest point. For reasons of strength, and for a defined and reproducible application of force over the abutment face 109, the remainder of the base 106 is set back with respect to the backplate 111 in such a manner that, in principle, there is no further direct contact with the backplate 111. This is achieved by the provision adjacent to the abutment face 109 of an annular continuous bead 113 and of a circular face 114 adjacent thereto, the circular face 114 being, for example, set back at least slightly—for example, by a few tenths of a millimeter—with respect to the abutment face 109. As is apparent in FIG. 7, the bead 113 has an obtuse aperture angle $\beta$ with two sides, the radially inner side of which is provided for the transmission of force through a conical surface 118.

In addition, a circumferential groove 115 is formed from radially outside, and axially offset from the base 106, from radially outside in the wall 105 in such a manner that a circumferential shoulder 116 is present radially on the inside. The protective cap (not illustrated further) is in principle fitted into the groove 115.

If the features mentioned are produced without cutting, for example by deep drawing, pressing and/or rolling, in combination with metallic sheet steel materials, an advantageous strain-hardening is achieved, so that workpieces with good load-bearing capacity are produced with a comparatively small outlay of material, and without requiring a hardening process. It is self-evident that this advantageous hardening can even be achieved if cold forming from solid is selected—for example, for producing pistons 101 with comparatively small diameters.

As is clearly apparent from the figure, the threaded nut 103 bears indirectly against the conical surface 118 of the base 106 via a pressure piece 117. In this case the conical surface 118 of the base is obtained at least in principle by the impressing of the bead 113. The two opposite conical surfaces 118 preferably include with the longitudinal axis AA in the axial direction an angle $\alpha$ of approximately 60°, whereby a centered and defined abutment of the pressure piece 117 is ensured. Conical surfaces of the same basic construction are provided between the threaded nut 103 and the pressure piece 117, all the conical surfaces especially preferably having matching conicities with matching aperture angles.

In order to reduce the axial installation space requirement, it is provided that the pressure piece 117 has a central through-bore 119 for receiving a threaded spindle 102. This is especially advantageous for space-saving accommodation of the spindle—both in the unactivated state in the case of electromechanical systems and with the use of telescopic brake pad adjustment devices in combination with comparatively new-value brake pads 110. It is thus made possible for the threaded spindle 102 to pass through large portions of the piston 101 and the pressure piece 117. For the transmission function, it is also essential that housing 107, piston 101, pressure piece 117 and threaded nut 103 are configured to be non-rotatable relative to one another. This is achieved by correspondingly configured receptacles and anti-rotation measures between threaded nut 103 and pressure piece 117, and between pressure piece 117 and piston 101. To secure the pressure piece 117 and the threaded nut 103 against relative rotation, there may be provided a holding element 122 having a peg 123 which prevents relative rotation between threaded nut 103 and pressure piece 117 in a form-fitting manner.

In another embodiment it is possible to provide the receptacle 120 between pressure piece 117 and threaded nut 103 with a profiling which deviates from the cylindrical shape and prevents relative rotation of the components concerned. This may be effected, for example, by providing a key face or otherwise-designed form-fitting configuration (cam, toothing, flat face, feather key and the like) integrated in the receptacle 120.

For example, a toothing, a flattened key face or the like may be provided between pressure piece 117 and wall 105. A protective cap (not drawn) may serve to prevent rotation between piston 101 and housing 107.

After the pressure piece 117 has been provided at an end oriented towards the base with a circumferential recess 124 for receiving the shoulder 116, the shoulder 116 is received therein. In order that such a recess 124 can be vented with acceptable complexity and cost when the system is being filled with pressure medium, said recess 124 is connected to the interior 108 of the pot via at least one passage 125. The concrete implementation of the passage 125 is preferably such that either the pressure piece 117 is provided with a cut-away portion or the inner wall is provided with a channel-like depression. To achieve an especially large cross section of the passage, the features mentioned may also be provided in combination.

Since the pressure piece 117 in the form of an adapter part is made available with a variable overall length and a variable external diameter, and with an identically matching conical surface 118 and receptacle 120, 121 for a uniformly configured threaded nut 103 in each case, a modular piston system for different piston diameters making use of a large number of identical parts can be made possible in a simple and low-cost manner, as substantially only piston pots of various diameters with pressure pieces 117 and housings 107 adapted thereto are needed.

What is claimed:

1. A multi-part piston for a brake caliper of a hydraulically and/or mechanically and/or electromechanically actuatable disk brake, which piston is substantially in the form of a pot-shaped hollow cylinder which is open at one end and includes a base and a wall formed integrally thereon, wherein the base is configured to be subjected to brake pressure coming from an interior of the pot, so that an outwardly oriented abutment face of the base is configured to be pressed against a brake pad, and wherein the interior of the pot receives at least one pressure piece that is separate from the base, wherein the pressure piece and the base have surfaces oriented towards one another for transmitting power, and wherein the pressure piece has a receptacle and a conical surface for engaging with and transmitting power through a conical surface on a threaded nut, and wherein the pressure piece is arranged in the piston in a rotationally fixed manner by a profiling.

2. The piston as claimed in claim 1, wherein the pressure piece has a central through-bore for receiving a threaded spindle.

3. The piston as claimed in claim 1, wherein an inner wall of the piston has a receptacle for the pressure piece.

4. The piston as claimed in claim 1, wherein all the conical surfaces have identical conicity.

5. A multi-part piston for a brake caliper of a hydraulically and/or mechanically and/or electromechanically actuatable disk brake, which piston is substantially in the form of a pot-shaped hollow cylinder which is open at one end and includes a base and a wall formed integrally thereon, wherein the base is configured to be subjected to brake pressure coming from an interior of the pot, so that an outwardly oriented abutment face of the base is configured to be pressed against a brake pad, and wherein the interior of the pot receives at least one pressure piece that is separate from the base, wherein the pressure piece and the base have surfaces oriented towards one another for transmitting power, and wherein the pressure piece has a receptacle and a conical surface for engaging with and transmitting power through a conical surface on a threaded nut, wherein the pressure piece is axially and rotationally fixed within the piston.

6. The piston as claimed in claim 1, wherein the pressure piece includes a recess for receiving a bead, wherein the recess is located on a circumference of the pressure piece and at an end of the pressure piece that is oriented towards the base.

7. The piston as claimed in claim 6, wherein at least one passage is provided between the interior of the pot and the recess, in that there is provided a cut-away portion of the pressure piece and/or a depression in the inner wall.

* * * * *